(12) United States Patent
Marupaduga

(10) Patent No.: US 11,419,050 B1
(45) Date of Patent: Aug. 16, 2022

(54) OPTIMIZING EN-DC ANCHOR SELECTION IN A MULTI-BAND AND MULTI-ANCHOR NETWORK

(71) Applicant: T-MOBILE INNOVATIONS LLC, Overland Park, KS (US)

(72) Inventor: Sreekar Marupaduga, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 16/924,557

(22) Filed: Jul. 9, 2020

(51) Int. Cl.
| | |
|---|---|
| *H04W 48/20* | (2009.01) |
| *H04W 72/04* | (2009.01) |
| *H04W 48/16* | (2009.01) |
| *H04W 76/15* | (2018.01) |
| *H04W 52/24* | (2009.01) |
| *H04W 88/06* | (2009.01) |

(52) U.S. Cl.
CPC ........... *H04W 48/20* (2013.01); *H04W 48/16* (2013.01); *H04W 52/24* (2013.01); *H04W 72/0453* (2013.01); *H04W 76/15* (2018.02); *H04W 88/06* (2013.01)

(58) Field of Classification Search
CPC ..... H04S 88/06; H04S 72/0453; A01G 13/10; A01G 9/28; A01G 13/0231; A01G 13/0237; A01G 25/00; A01G 13/0243; A01M 29/30; B60J 7/0084; B60J 7/141; B62D 33/046; F16B 5/0084; F16B 5/0607; F16B 2005/0678; F21S 8/081; F21S 9/035; F21V 21/0824; H02S 20/10; Y02E 10/50; H04W 48/20; H04W 48/16; H04W 52/24; H04W 72/0453; H04W 76/15; H04W 88/06
See application file for complete search history.

(56) References Cited

U.S. PATENT DOCUMENTS

2021/0022073 A1\* 1/2021 Kwok ................... H04W 76/15

\* cited by examiner

*Primary Examiner* — Diane D Mizrahi

(57) ABSTRACT

Methods and systems are provided for optimizing EN-DC anchor selection in a multi-band and multi-anchor network. One or more of a sector power ratio, a front to back ratio, or a downlink tonnage is determined for a plurality of nodes comprising one or more eNodeBs and one or more gNodeBs. Based on the determining, an eNodeBs of the one or more eNodeBs or a gNodeB of the one or more gNodeBs is selected as an EN-DC anchor of the multi-band and multi-anchor network.

19 Claims, 6 Drawing Sheets

OPTIMIZING EN-DC ANCHOR SELECTION IN A MULTI-BAND AND MULTI-ANCHOR NETWORK

SUMMARY

The present disclosure is directed, in part, to optimizing EN-DC anchor selection in a multi-band and multi-anchor network, substantially as shown in and/or described in connection with at least one of the figures, and as set forth more completely in the claims.

In brief and at a high level, this disclosure describes, among other things, methods and systems for optimizing EN-DC anchor selection in a multi-band and multi-anchor network. To do so, one or more of a sector power ratio, a front to back ratio, or a downlink tonnage is determined for a plurality of nodes comprising one or more eNodeBs and one or more gNodeBs. Based on the determining, an eNodeBs of the one or more eNodeBs or a gNodeB of the one or more gNodeBs is selected as an EN-DC anchor of the multi-band and multi-anchor network.

In some aspects, upon determining the sector power ratio of the one or more eNodeBs or the one or more gNodeBs exceeds a configurable threshold, channel bandwidth combinations of the one or more eNodeBs or the one or more gNodeBs is determined. The location of a user device is determined and the user device may be assigned to the lower bandwidth channel of the channel bandwidth combinations.

Additionally or alternatively, the one or more eNodeBs or the one or more gNodeBs may be prioritized based on the front to back ratio of each of the one or more eNodeBs or the one or more gNodeBs. The eNodeB of the one or more eNodeBs or the gNodeB of the one or more gNodeBs with the highest front to back ratio may be selected.

Additionally or alternatively, the downlink tonnage may be determined for each channel of the one or more eNodeBs and the one or more gNodeBs. The channel with the highest downlink tonnage may be selected for each of the one or more eNodeBs and the one or more gNodeBs.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present technology is described in detail below with reference to the attached drawing figures, wherein.

DETAILED DESCRIPTION

Figure 1:
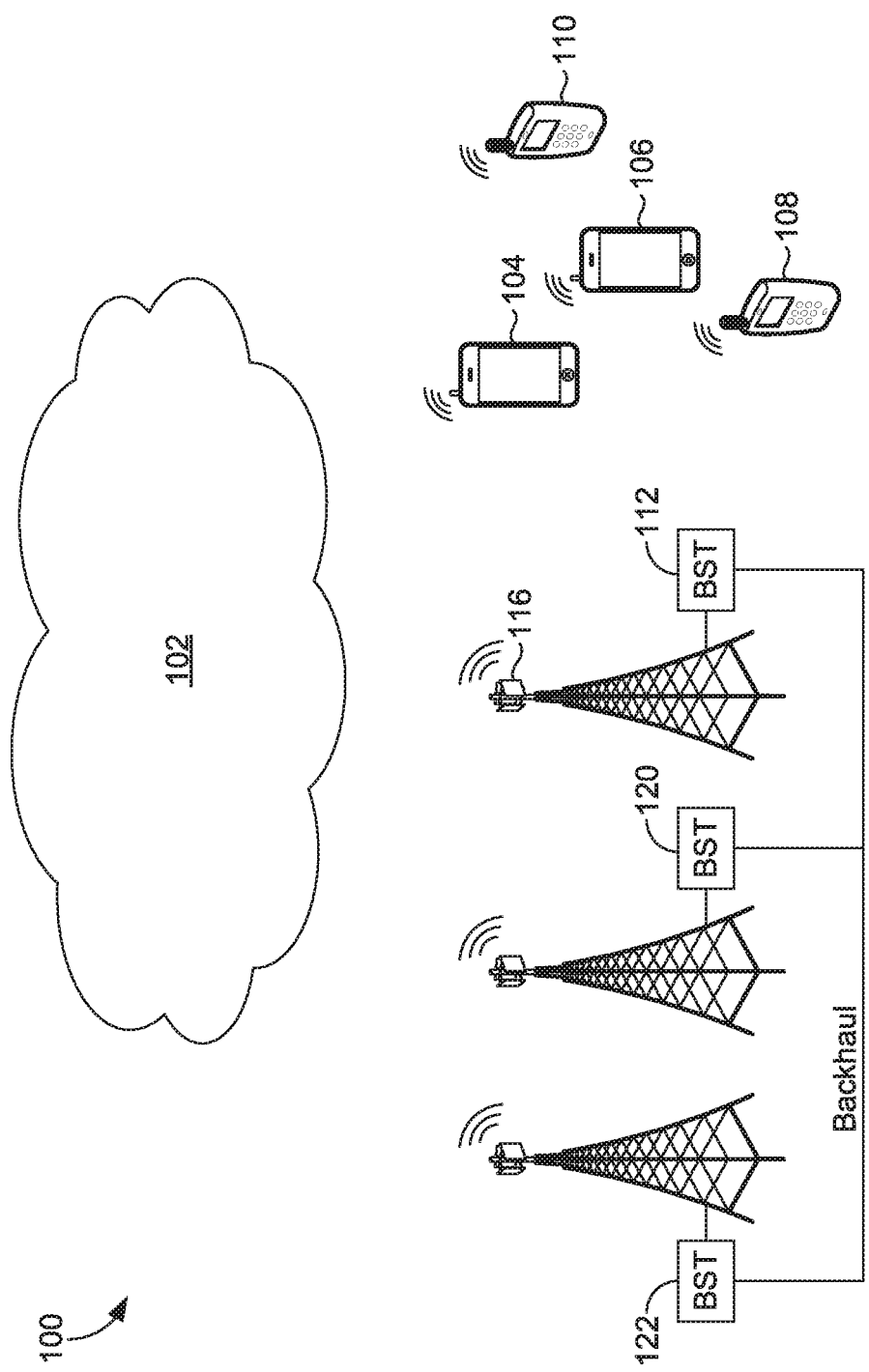
FIG. 1 depicts a diagram of an exemplary computing environment suitable for use in implementations of the present disclosure.

The subject matter of embodiments of the present disclosure is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
CD-ROM Compact Disk Read Only Memory
CDMA Code Division Multiple Access
eNodeB Evolved Node B
EN-DC E-UTRAN New Radio-Dual Connectivity
GIS Geographic/Geographical/Geospatial Information System
gNodeB Next Generation Node B
GSM Global System for Mobile communications
DVD Digital Versatile Discs
EEPROM Electrically Erasable Programmable Read Only Memory
FD-MIMO Full Dimensional Multiple Input Multiple Output
HSDPA High Speed Downlink Packet Access
LTE Long Term Evolution
MIMO Multiple Input Multiple Output
mMIMO Massive Multiple Input Multiple Output
MU-MIMO Multiple User Multiple Input Multiple Output
PC Personal Computer
PDA Personal Digital Assistant
RAM Random Access Memory
RF Radio-Frequency
RLFs Radio Link Failures
ROM Read Only Memory
SHF Super High Frequency SINR Transmission-to-Interference-Plus-Noise Ratio
SMS Short Message Service
SPR Sector Power Ratio
UE User Equipment
UHF Ultra High Frequency
UMTS Universal Mobile Telecommunications Systems
VHF Very High Frequency
WCDMA Wideband Code Division Multiple Access
WiMAX Worldwide Interoperability for Microwave Access Further, various technical terms are used throughout this description. An illustrative resource that fleshes out various aspects of these terms can be found in Newton's Telecom Dictionary, 31st Edition (2018).

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and non-removable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, DVD, holographic media or other optical disc storage, magnetic cassettes, magnetic tape, magnetic disk storage, and other magnetic storage devices and may be considered transitory, non-transitory, or a combination of both. These memory components can store data momentarily, temporarily, or permanently.

Communications media typically store computer-useable instructions, including data structures and program modules, in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, wireless telecommunication networks provide access for a user device (e.g., a UE) to access one or more network services. In some cases, the desired network service may be a telecommunication service. In conventional systems, the device may communicate with the cell site and request or indicate that the device prefers to connect with the cell site on a specific frequency band with a lower latency and a higher speed compared to other available frequency bands. For example, conventional systems automatically connect to 5G when in range of both 5G and 4G. As another example, conventional systems automatically connect to 5G when connected to 4G and come within range of 5G. In such conventional systems, the cell site or network automatically initiates access and communication with the device over the largest bandwidth channel. Unfortunately, these conventional systems do not always select the best available channel as the EN-DC anchor and resource block allocation and UE performance suffers.

The systems and methods provided herein can alleviate one or more of the problems discussed above. For example, in certain scenarios, it may be desirable to strategically connect to 4G and/or 5G on a lower bandwidth channel. In a scenario where a UE is connected to a higher bandwidth channel and the antenna sector power ratio (SPR) is high, the UE is utilizing more resources than needed. This can be problematic when there is a high retransmission rate and resource blocks are not available. To alleviate this, rather than assigning carrier aggregation or a higher bandwidth channel, the lower bandwidth channel can be assigned as the anchor band.

In other scenarios, there may be multiple eNodeBs available for connection. Although legacy UEs do not have 5G, they are able to connect to 5G radios and may not connect to the best available eNodeB available to achieve optimal service. Similarly, if multiple gNodeBs are available and the UE has 5G, the UE may not connect to the best available gNodeB to achieve optimal service. To select the best available eNodeB or gNodeB, front to back ratio can be used as a criteria for determining the anchor band.

Finally, in conventional systems, UEs may not be connected to the best available channel. For example, available LTE and 5G channels may provide different downlink tonnage (e.g., LTE channels: 50 Mbps, 35 Mbps, and 45 Mbps; 5G channels: 120 Mbps, 85 Mbps, and 75 Mbps). In this case, downlink tonnage may be determined for each channel and the channel with the highest performance should be selected for as the anchor band (e.g., LTE channel: 50 Mbps and 5G channel: 120 Mbps).

In aspects, a system disclosed herein optimizes the selection of the EN-DC anchor in a multi-band and multi-anchor network. The system may comprise a plurality of nodes comprising one or more eNodeBs and one or more gNodeBs, each of the plurality of nodes configured to wirelessly communicate with one or more user devices in a geographic service area. The system may further comprise one or more processors configured to perform operations. The operations may comprise: determining a sector power ratio of the one or more eNodeBs or the one or more gNodeBs; upon determining the sector power ratio of the one or more eNodeBs or the one or more gNodeBs exceeds a configurable threshold, determining channel bandwidth combinations of the one or more eNodeBs or the one or more gNodeBs; and assigning the user device to the lower bandwidth channel of the channel bandwidth combinations. Additionally or alternatively, the operations may comprise: prioritizing the one or more eNodeBs or the one or more gNodeBs based on a front to back ratio of each of the one or more eNodeBs or the one or more gNodeBs; and selecting the eNodeB of the one or more eNodeBs or the gNodeB of the one or more gNodeBs with the highest front to back ratio. Additionally or alternatively, the operations may comprise: determining the downlink tonnage for each channel of the one or more eNodeBs and the one or more gNodeBs; and selecting the channel for with the highest downlink tonnage for each of the one or more eNodeBs and the one or more gNodeBs.

In other aspects, one or more non-transitory computer-readable media disclosed herein can have computer-executable instructions embodied thereon that, when executed, perform a method for optimizing EN-DC anchor selection in a multi-band and multi-anchor network. The method comprises determining one or more of a sector power ratio, a front to back ratio, or a downlink tonnage for a plurality of nodes comprising one or more eNodeBs and one or more gNodeBs, each of the plurality of nodes configured to wirelessly communicate with one or more user devices in a geographic service area. The method also comprises based on the determining, selecting an eNodeBs of the one or more eNodeBs or a gNodeB of the one or more gNodeBs as an EN-DC anchor of the multi-band and multi-anchor network.

Yet another aspect of the present disclosure is directed to a method for optimizing EN-DC anchor selection in a multi-band and multi-anchor network. The method comprises determining one or more of a sector power ratio, a front to back ratio, or a downlink tonnage for a plurality of nodes configured to wirelessly communicate with one or more user devices in a geographic service area. The method also comprises based on the determining, selecting a node of the plurality of nodes as an EN-DC anchor of the multi-band and multi-anchor network.

Optimizing the EN-DC anchor selection, as recited by the claims, provides a variety of technical benefits, including benefits for users. For example, in situations where SPR is high, high retransmission rates and scarcity of resource blocks can be avoided. In this way, overall resource block allocation is optimized when a lower bandwidth channel is assigned rather than assigning carrier aggregation or a higher bandwidth channel. In another example, in situations where there are multiple eNodeBs and/or multiple gNodeBs available, the best eNodeB and/or gNodeB can be selected to provide optimal service. Lastly, in situations where multiple channels are available for 4G and/or 5G, the channel with the highest performance can be selected as the anchor for each UE for 4G and/or 5G, maximizing throughput.

Turning now to FIG. 1, an example of a network environment 100 suitable for use in implementing embodiments of the present disclosure is provided. The network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

The network environment 100 includes a network 102 that provides service to current UE 104 and 106 and one or more legacy UE 108 and 110. The network 102 may be accessible through a base station 112 that is connected to a backhaul server (not shown). The base station 112 and/or a computing device (e.g., whether local or remote) associated with the base station 112 may manage or otherwise control the operations of components of a cell site, including an antenna array 116. The base station 112 and/or the computing device associated with the base station 112 may include one or more processors and computer-readable storage media having computer-executable instructions or computer instruction modules embodied thereon for execution by one or more processors.

The antenna array 116 may radiate in a particular direction and thus may correspond to a particular sector of a cell site. The antenna array 116 may have a plurality of antenna elements, in embodiments. In one embodiment, the antenna array 116 is configured to have a plurality of elements that in number, arrangement, and/or density, are configured for mMIMO. In one such embodiment, the base station 112 may include a radio and/or a controller, such as a Massive Multiple-Input Multiple-Output Unit for controlling a mMIMO configured antenna array, such as the antenna array 116 having a plurality of antenna elements. The base station 112 may use the controller to monitor one or more of throughput, signal quality metrics (e.g., SINR), a quantity of unique users/subscribers, a quantity of unique UE(s), and/or RLFs that occur at the base station, all of which may be monitored dynamically and/or as stored in a data store.

The base station 112 may use a radio that is connected to the antenna array 116 by a physical RF path, where the radio is used to cause the antenna array 116 to transmit radio-frequency signals using the plurality of antenna elements. The plurality of antenna elements in the antenna array 116 may include portions of antenna elements (not shown). In embodiments, the plurality of antenna elements of the antenna array 116 may be partitioned such that a first portion of antenna elements may be associated with, dedicated to, correspond to, and/or be configured to operate using a first access technology, and a second portion of antenna elements may be associated with, dedicated to, correspond to, and/or be configured to operate using a second access technology. In one embodiment, the plurality of antenna elements may be partitioned into unequal groups or alternatively "split" into equal halves, wherein each group or half operates to provide a coverage area for a distinct access technology when the antenna array 116 operates in a dual technology mode.

In some embodiments, the antenna array 116 is partitioned such that the first portion of antenna elements is associated with the first access technology and the second portion of antenna elements is associated with the second access technology. When the antenna array 116 is operating in a dual technology mode, each portion of the plurality of antenna elements may operate using only one distinct protocol and/or access technology relative to the other portions in the antenna array, in some embodiments. In one example, a first portion of antenna elements may operate using 5G wireless access technology and the second portion of antenna elements may operate using 4G wireless access technology. Additionally, it will be understood that the terms "first" and "second" are used herein for the purposes of clarity in distinguishing portions of antenna elements from one another, but the terms are not used herein to limit the sequence, relevance, number of portions, technological functions, and/or operations of each portion unless specifically and explicitly stated as such.

As such, the base station 112 may provide current UE 104 and 106 and legacy UE 108 and 110 with access to the network 102, in embodiments. In some embodiments, the first portion of antenna elements may communicate with current UE 104 and 106 using 5G technology and the second portion of the antenna elements may communicate with legacy UE 108 and 110 using 4G technology. When operating in the dual technology mode, the antenna array 116 may concurrently connect to and communicate with the current UE 104 and 106 and legacy UE 108 and 110 using, respectively, at least two distinct access technologies.

Accordingly, in one example, when the antenna array 116 is operating in the dual technology mode, the base station 112 concurrently acts an eNodeB (or "eNB") and gNodeB (or "gNB"). As such, the base station 112 may provide service to one or more access technologies to both current and legacy UE. In addition to communicating with the current UE 104 and 106 and the legacy UE 108 and 110, the base station 112 may also communicate with one or more neighboring base stations. In some embodiments, the base station 112 may communicate with neighboring base station 120 using the first access technology and may communicate with another neighboring base station 122 using the second access technology. For example, because the base station 112 may operate concurrently as an eNodeB and a gNodeB using the antenna array 116 that is partitioned and operating in a dual technology mode, the base station 112 may communicate with other base stations, for example, including legacy base stations that cannot use current access technologies (e.g., 5G) or current base stations that lack backward compatibility with prior access technologies (e.g., 4G). In embodiments, the base station 112 may bi-directionally exchange information with neighboring base stations 120 and 122 through an X2 interface or X2 link. Information regarding signal quality, RF conditions, one or more RLFs, and SINR levels at each of the neighboring base stations 120 and 122, and/or as reported from UE to the neighboring base stations 120 and 122 may be communicated to the base station 112 via the X2 link. Additionally or alternatively, information regarding signal quality, RLFs, and SINR levels at each of the neighboring base stations 120 and 122 may be communicated to the base station 112 over the backhaul.

As mentioned, the base station 112 may include a radio and/or a controller, such as an MMU, that enables the base station 112 to adjust or modify the operations and transmissions of the plurality of antenna elements in the antenna array 116. In embodiments, the operations, configurations, and/or settings of each antenna element may be individually controlled and adjusted by the base station 112 using the controller. In some embodiments, the operations, configurations, and/or settings of the first portion of antenna elements may be controlled and adjusted as a group by the base station 112 using a controller, such as an MMU, independent of the second portion of antenna elements. In a similar fashion, the operations, configurations, and/or settings of the second portion of antenna elements may be controlled and adjusted as a group by the base station 112 using the controller, independent of the first portion of antenna elements. Accordingly, the base station 112 may use a controller to independently adjust different groups or portions of antenna elements within one antenna array.

In embodiments, the operations, configurations, and/or settings of each individual antenna element may be adjusted and customized. For example, the base station 112 instructs a portion of antenna elements to transmit one or more synchronization signals using a periodicity. In another example, the portion of antenna elements may transmit a plurality of synchronization signals using the periodicity, as instructed by the base station 112. The synchronization signals may be specific to and/or configured for the first access technology, in embodiments.

Accordingly, the base station 112 may use a controller to independently adjust different individual antenna elements, any number of groupings and/or subset(s) of each portion of antenna elements, and/or portions of antenna elements within one antenna array. In embodiments, the base station 112 may use a controller to measure and monitor one or more of throughput, signal quality metrics (e.g., SINR), a quantity of unique users/subscribers, a quantity of unique UE, and/or RLFs.

Figure 2:
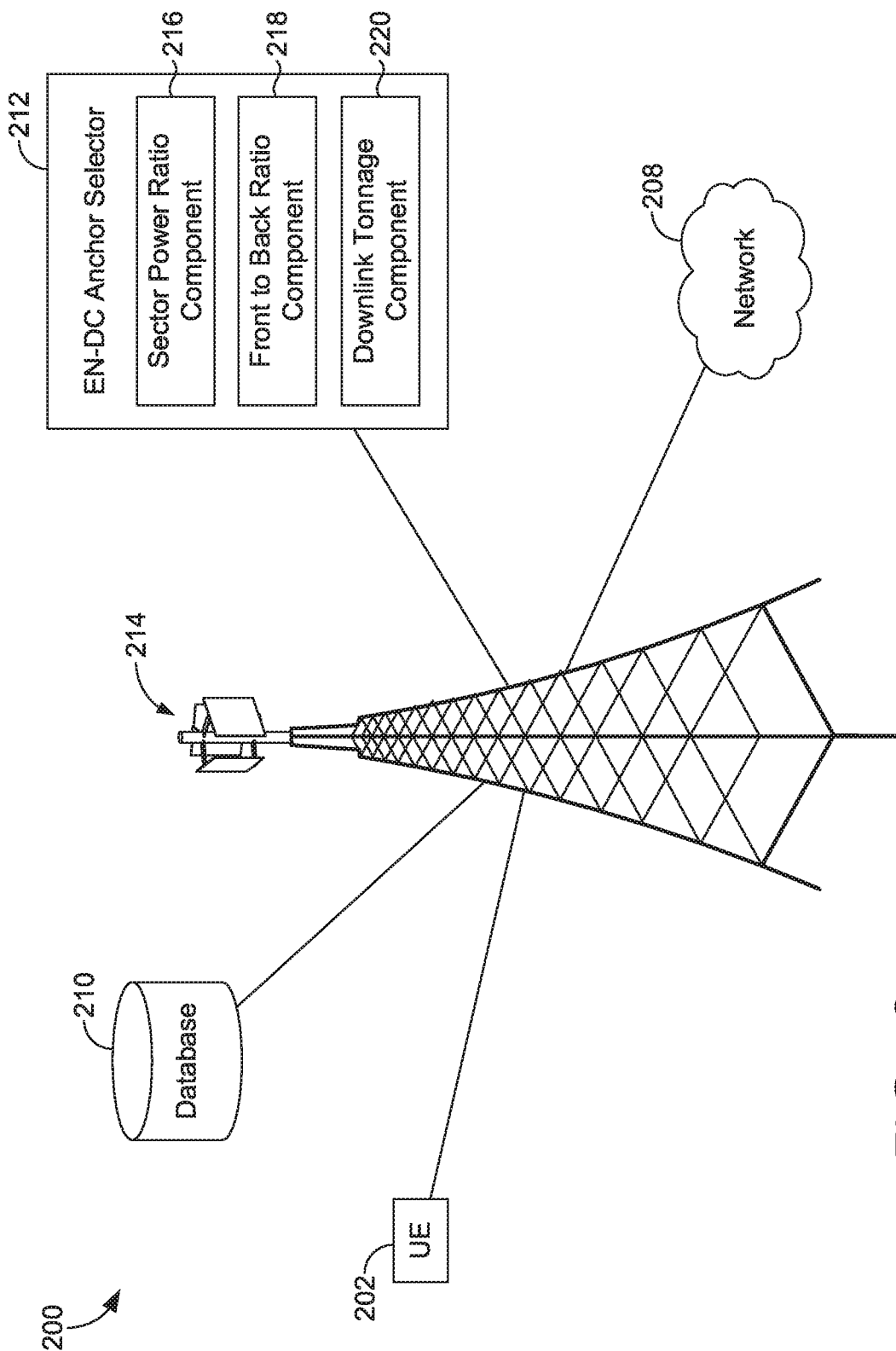
FIG. 2 illustrates a diagram of an exemplary network environment in which implementations of the present disclosure may be employed.

Turning now to FIG. 2, network environment 200 is an exemplary network environment in which implementations of the present disclosure may be employed. Network environment 200 is one example of a suitable network environment and is not intended to suggest any limitation as to the scope of use or functionality of the present disclosure. Neither should the network environment be interpreted as having any dependency or requirement relating to any one or combination of components illustrated.

Network environment 200 includes UE 202 (network environment 200 may contain more UEs), network 208, database 210, EN-DC anchor selector 212, and cell site 214. In the network environment 200, UE 202 may take on a variety of forms, such as a PC, a user device, a smart phone, a smart watch, a laptop computer, a mobile phone, a mobile device, a tablet computer, a wearable computer, a PDA, a server, a CD player, an MP3 player, a global positioning system (GPS) device, a video player, a handheld communications device, a workstation, a router, an access point, and any combination of these delineated devices, or any other device that communicates via wireless communications with a cell site 214 in order to interact with network 208, which may be a public or a private network.

In some aspects, the UE 202 corresponds to a user device or a computing device. For example, the user device may include a display(s), a power source(s) (e.g., a battery), a data store(s), a speaker(s), memory, a buffer(s), a radio(s) and the like. In some implementations, the UE 202 comprises a wireless or mobile device with which a wireless telecommunication network(s) may be utilized for communication (e.g., voice and/or data communication). In this regard, the user device may be any mobile computing device that communicates by way of a wireless network, for example, a 3G, 4G, 5G, LTE, CDMA, or any other type of network.

In some cases, the UE 202 in network environment 200 may optionally utilize network 208 to communicate with other computing devices (e.g., a mobile device(s), a server(s), a personal computer(s), etc.) through cell site 214. The network 208 may be a telecommunications network(s), or a portion thereof. A telecommunications network might include an array of devices or components (e.g., one or more base stations), some of which are not shown. Those devices or components may form network environments similar to what is shown in FIG. 2, and may also perform methods in accordance with the present disclosure. Components such as terminals, links, and nodes (as well as other components) may provide connectivity in various implementations. Network 208 may include multiple networks, as well as being a network of networks, but is shown in more simple form so as to not obscure other aspects of the present disclosure.

Network 208 may be part of a telecommunication network that connects subscribers to their service provider. In aspects, the service provider may be a telecommunications service provider, an internet service provider, or any other similar service provider that provides at least one of voice telecommunications and data services to UE 202 and any other UEs. For example, network 208 may be associated with a telecommunications provider that provides services (e.g., LTE) to the UE 202. Additionally or alternatively, network 208 may provide voice, SMS, and/or data services to user devices or corresponding users that are registered or subscribed to utilize the services provided by a telecommunications provider. Network 208 may comprise any communication network providing voice, SMS, and/or data service(s), using any one or more communication protocols, such as a 1× circuit voice, a 3G network (e.g., CDMA, CDMA2000, WCDMA, GSM, UMTS), a 4G network (WiMAX, LTE, HSDPA), or a 5G network. The network 208 may also be, in whole or in part, or have characteristics of, a self-optimizing network.

In some implementations, cell site 214 is configured to communicate with the UE 202 that is located within the geographical area defined by a transmission range and/or receiving range of the radio antennas of cell site 214. The geographical area may be referred to as the "coverage area" of the cell site or simply the "cell," as used interchangeably hereinafter. Cell site 214 may include one or more base stations, base transmitter stations, radios, antennas, antenna arrays, power amplifiers, transmitters/receivers, digital signal processors, control electronics, GPS equipment, and the like. In particular, cell site 214 may be configured to wirelessly communicate with devices within a defined and limited geographical area. For the purposes of the present disclosure, it may be assumed that it is undesirable and unintended by the network 208 that the cell site 214 provide wireless connectivity to the UE 202 when the UE 202 is geographically situated outside of the cell associated with cell site 214.

In an exemplary aspect, the cell site 214 comprises a base station that serves at least one sector of the cell associated with the cell site 214, and at least one transmit antenna for propagating a signal from the base station to one or more of the UE 202. In other aspects, the cell site 214 may comprise multiple base stations and/or multiple transmit antennas for each of the one or more base stations, any one or more of which may serve at least a portion of the cell. In some aspects, the cell site 214 may comprise one or more macro cells (providing wireless coverage for users within a large geographic area) or it may be a small cell (providing wireless coverage for users within a small geographic area). For example, macro cells may correspond to a coverage area having a radius of approximately 1-15 miles or more, the radius measured at ground level and extending outward from an antenna at the cell site. In another example, a small cell may correspond to a coverage area having a radius of approximately less than three miles, the radius measured at ground level and extending outward from an antenna at the cell site.

As shown, cell site 214 is in communication with the EN-DC anchor selector 212, which comprises sector power ratio component 216, front to back ratio component 218, and downlink tonnage component 220. The EN-DC anchor selector 212 may utilize various criteria to optimize selection of an EN-DC anchor in a multi-band and multi-anchor network. In this way, the EN-DC anchor selector 212 may dynamically determine which UEs in a given sector are assigned to which specific channels as the EN-DC anchor.

For example, based on information received by sector power ratio component 216, the EN-DC anchor selector 212 may assign UEs that are cell near and cell center to a larger bandwidth channel an EN-DC anchor. In contrast, based on information received by sector power ratio component 216, the EN-DC anchor selector 216 may assign UEs that are cell edge to smaller bandwidth channel as an EN-DC anchor 216. Sector power ratio component 216 may communicate with the database 210 for storing and retrieving data.

Sector power ratio component 216 may retrieve data from the UE 202, the network 208, the database 210, and the cell site 214. In some embodiments, sector power ratio component 216 may access data including, but not limited to, location information of the UE 202. Location information may comprise GPS or other satellite location services, terrestrial triangulation, an access point location, or any other means of obtaining coarse or fine location information. The location information may indicate geographic location(s) of one or more of a user device, an antenna, a cell tower, a cell site, and/or a coverage area of a cell site, for example.

The sector power ratio component 216 may also access sector power ratio (SPR). SPR is a measure of an antenna's ability to minimize interference. SPR describes a RF power that is radiated outside of an antenna array's sector relative to a RF power that is radiated and retained within the antenna array's sector. Because SPR is a ratio, SPR may be represented using a percentage value or numerical value. An example of a low SPR value is 3-4% and an example of a high SPR value is 8-10%. Antennas with greater spillover areas have greater SPR values. SPR information may be used for dynamically combatting interference and noise at cell site 214. Additionally, the SPR values of cell site antennas may be used for selection and assignment of specific frequency bands to component carriers of UEs in a telecommunications environment.

Increased or high SPR values have negative impacts, which are exacerbated in LTE environments that allow and facilitate multiple frequency bands and carrier aggregation for combining multiple frequency bands for uplink and/or downlink communications. Negative effects that high-powered, undesired RF radiation at a cell site cause may be reduced or mitigated by assigning a frequency band of low-SPR antennas to a primary component carrier of a UE. For example, a frequency band that corresponds to a low-SPR antenna may be assigned to the primary component carrier of an inter-carrier aggregation capable device that is geographically located at or near radio frequency "spillover" areas (i.e., radiation outside of an antenna's desired sector at a cell site) and which is experiencing lower throughput.

Additionally, SPR quantifies the power of RF radiation that is outside of the sector of an antenna relative to the power of the RF radiation radiated within the same sector of the same antenna. As such, the SPR represents the power of the undesired RF signal relative to the power of the desired RF signal, for a particular antenna. Accordingly, SPR is a measure of power and undesired RF radiation refers to an amount of power of the undesired RF radiation. Thus, as undesired RF spillover of an antenna increases, the SPR of the same antenna increases and vice versa, when all other factors are controlled. As undesired RF spillover and SPR increase, interference and noise increase at the cell site 214. Due to these measures, SPR may be used as a predictor, indictor, and/or measure of an antenna's likelihood of causing interference and noise, or actual causation of interference and noise. SPR may be affected by orientation (i.e., how the service coverage area has been partitioned into sectors), electrical tilt, mechanical tilt, carrier band associated with an antenna, technical operating specifications of an antenna, manufacturing and materials of an antenna, environmental conditions (i.e., weather, heat, wear and tear), and power supplied to an antenna, for example.

Further, SPR for an antenna may be calculated using RF radiation patterns. For example, the SPR of the antenna accounts for the power of its undesired RF signal relative to the power of the desired RF signal. The SPR of the antenna quantifies the amount of power of the undesired RF radiation contributed by the antenna to areas relative to the amount of power of the desired RF radiation in a sector of the antenna. Due to spillover among various antennas, certain areas experience the presence of interference and noise.

Because SPR values may be affected by orientation (i.e., how the service coverage area has been partitioned into sectors), electric tilt, mechanical tilt, specific frequencies of a carrier band associated with an antenna, technical operating specifications of an antenna, manufacturing and materials of an antenna, environmental conditions, and power supplied to an antenna, the sector power ratio component 216 may dynamically determine SPR values of antennas at the cell site 214 when a UE enters the service coverage area of the cell site. Alternatively, sector power ratio component 216 may determine SPR values of the antennas at the cell site 214 periodically and store the SPR values in the database 210 at the base station controlling the cell site 214. Stored SPR values may be referenced when a UE enters a service coverage area of the cell site 214. Additionally or alternatively, SPR values of the antennas at the cell site 214 may be determined for individual antennas when each antenna is installed at the cell site and stored in database 210 at the base station controlling the cell site 214. In this way, dynamically determined or periodically updated SPR values may be compared, for example, by the base station to an initial or installation SPR value so that the performance of each antenna can be monitored, for example.

Figure 3:
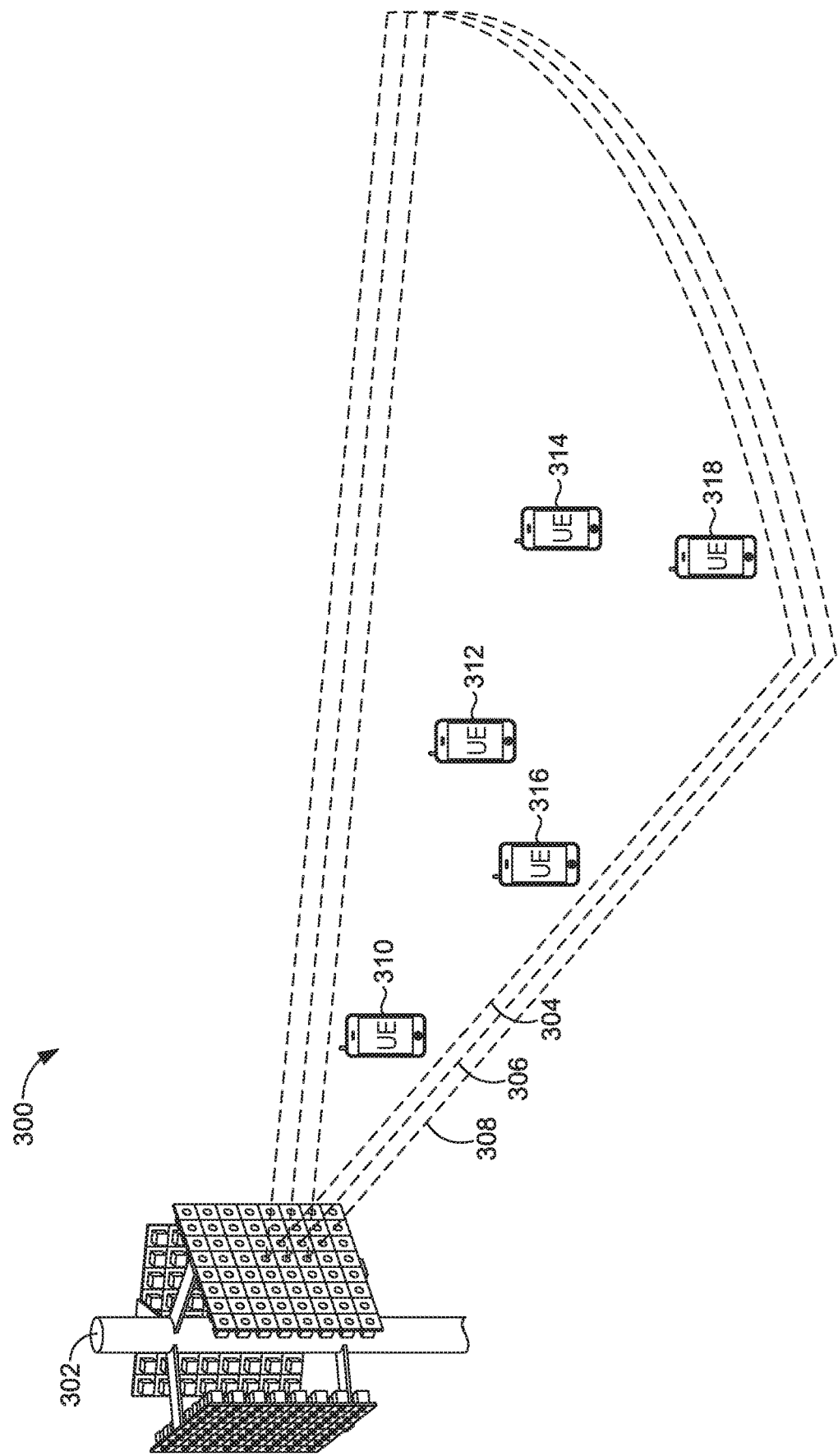
FIG. 3 illustrates exemplary EN-DC anchor selection utilizing sector power ratio, in accordance with implementations of the present disclosure.

For example, and referring now to FIG. 3, an exemplary EN-DC anchor selection utilizing sector power ratio 300 is illustrated, in accordance with implementations of the present disclosure. As shown, multiple UEs 310, 312, 314, 316, and 318 are within range of antenna 302. Now suppose antenna 302 has multiple 5G NR channels 304, 306 available. In situations where sector power ratio component 216 determine the SPR is high or exceeds a particular threshold and multiple 5G NR channels 304, 306 are available, EN-DC anchor selector 202 considers UE location, which may be received from the UE, the eNodeB, or the gNodeB. For all UEs that are located in an undesired location (e.g., cell edge), EN-DC anchor selector assigned the lower bandwidth channel. In FIG. 3, assume channel 304 is 60 MHz and channel 306 is 40 MHz. Rather than assigning carrier aggregation or the higher bandwidth channel as conventional systems currently do, EN-DC anchor selector 202 will assign cell edge UEs 316 and 318 to the lower bandwidth channel 306. Additionally, EN-DC anchor selector 202 will assign cell near and cell center UEs 310, 312, 314 to the higher bandwidth channel 304. In doing so, resource block allocation is optimized.

Figure 4:
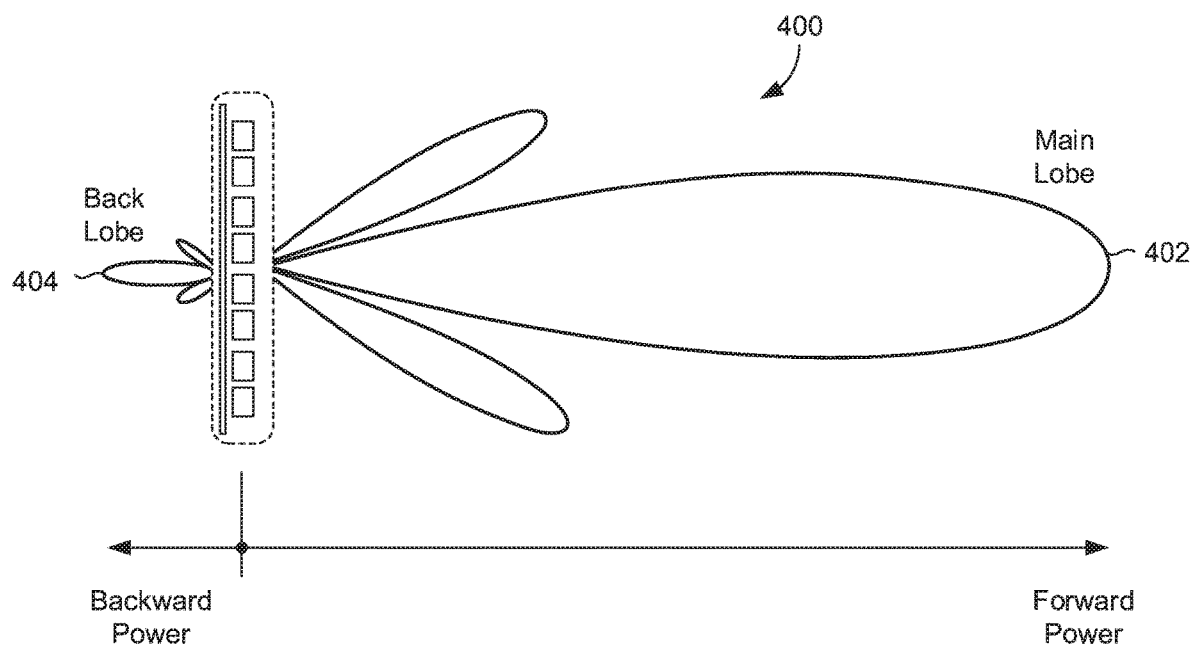
FIG. 4 illustrates exemplary EN-DC anchor selection utilizing front to back power ratio, in accordance with implementations of the present disclosure.

In another example, based on information received by front to back ratio component 218, the EN-DC anchor selector 212 may prioritize a plurality of eNodeBs or gNodeBs. To do so, the front to back ratio of each of the plurality of eNodeBs or gNodeBs is determined by front to back ratio component 218. EN-DC anchor selector 212 selects the eNodeB or gNodeB with the highest front to back ratio as the EN-DC anchor. Referring now to FIG. 4, an exemplary EN-DC anchor selection utilizing front to back ratio 400 is illustrated, in accordance with implementations of the present disclosure. As shown, the power radiated in the front or main lobe 402 represents the forward power of the antenna. The power radiated in the opposite direction (i.e., the back lobe 404) represents the backward power of the antenna. For clarity, front to back ratio of an antenna is the ratio of power radiated in the front or main radiation lobe and the power radiated in the opposite direction (180 degrees from the main beam), as shown below:

Front to Back ratio=Forward Power (*F*)/Backward Power (*B*)

In a hypothetical pool of one eNodeB and multiple gNodeBs, selecting the gNodeB with the highest front to back ratio as the secondary node (i.e., the EN-DC anchor) provides the best user experience for a particular UE. Likewise, in a hypothetical pool of one gNodeB and multiple eNodeBs, selecting the eNodeB with the highest front to back ratio as the master node (i.e., the EN-DC anchor) provides the best user experience for a particular UE. Accordingly, the EN-DC anchor selector 212 receives the front to back ratio for a pool of multiple eNodeBs and/or multiple gNodeBs and prioritizes the pool of eNodeBs and/or gNodeBs to select the appropriate master and/or secondary node(s).

Figure 5:
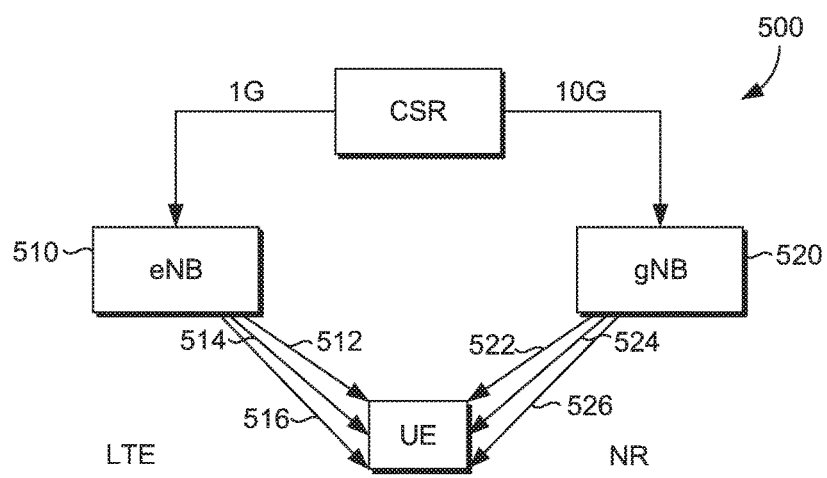
FIG. 5 illustrates exemplary EN-DC anchor selection utilizing downlink tonnage, in accordance with implementations of the present disclosure.

In yet another example, based on information received by downlink tonnage component 220, the EN-DC anchor selector 212 may utilize throughput on a specific carrier as a criteria to determine whether the specific carrier is a candidate for an EN-DC anchor. For example, and referring now to FIG. 5, an exemplary EN-DC anchor selection utilizing downlink tonnage 500 is illustrated, in accordance with implementations of the present disclosure. As illustrated, eNodeB 510 has three LTE channels 512, 514, and 516. Also as illustrated, gNodeB 520 has three 5G channels 522, 524, and 526. Assume that downlink tonnage component 220 determines that channel 512 has a downlink transmission data rate of 50 Mbps, channel 514 has a downlink transmission data rate of 35 Mbps, and channel 516 has a downlink transmission data rate of 45 Mbps. Now also assume that downlink tonnage component 220 determines that channel 522 has a downlink transmission data rate of 120 Mbps, channel 524 has a downlink transmission data rate of 85 Mbps, and channel 526 has a downlink transmission data rate of 75 Mbps. Rather than merely using location for a particular UE, as conventional systems currently do, the EN-DC anchor selector 212 receives the downlink transmission data rate for each of the LTE channels 512, 514, and 516 and each of the 5G channels 522, 524, and 526 and prioritizes them for anchor selection. In this example, EN-DC anchor selector selects channel 512 and 522 as the EN-DC anchors.

Figure 6:
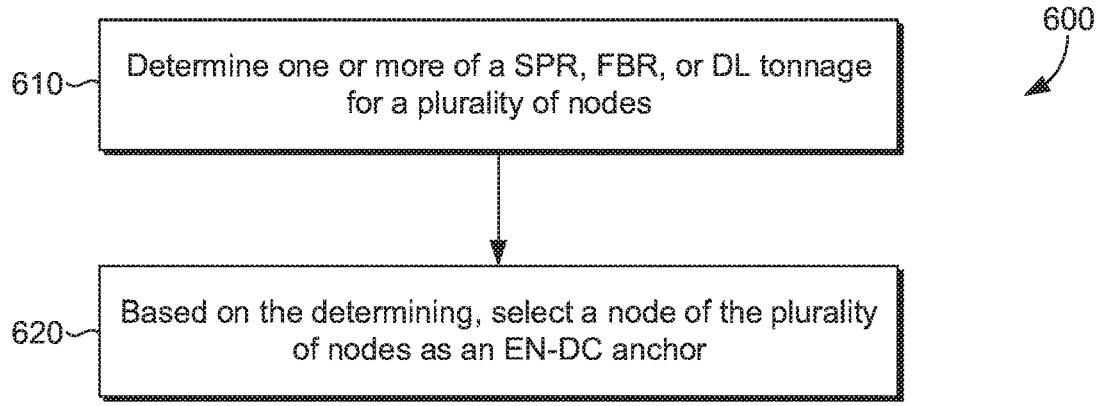
FIG. 6 depicts a flow diagram of an exemplary method for optimizing EN-DC anchor selection, in accordance with implementations of the present disclosure.

Turning now to FIG. 6, flow diagram 600 comprises an exemplary method for optimizing EN-DC anchor selection in a multi-band and multi-anchor network. Initially at block 610, one or more of sector power ratio (SPR), front to back ratio, or downlink tonnage is determined for a plurality of nodes. Based on the determining, at block 620, a node of the plurality of nodes is selected as an EN-DC anchor.

Figure 7:
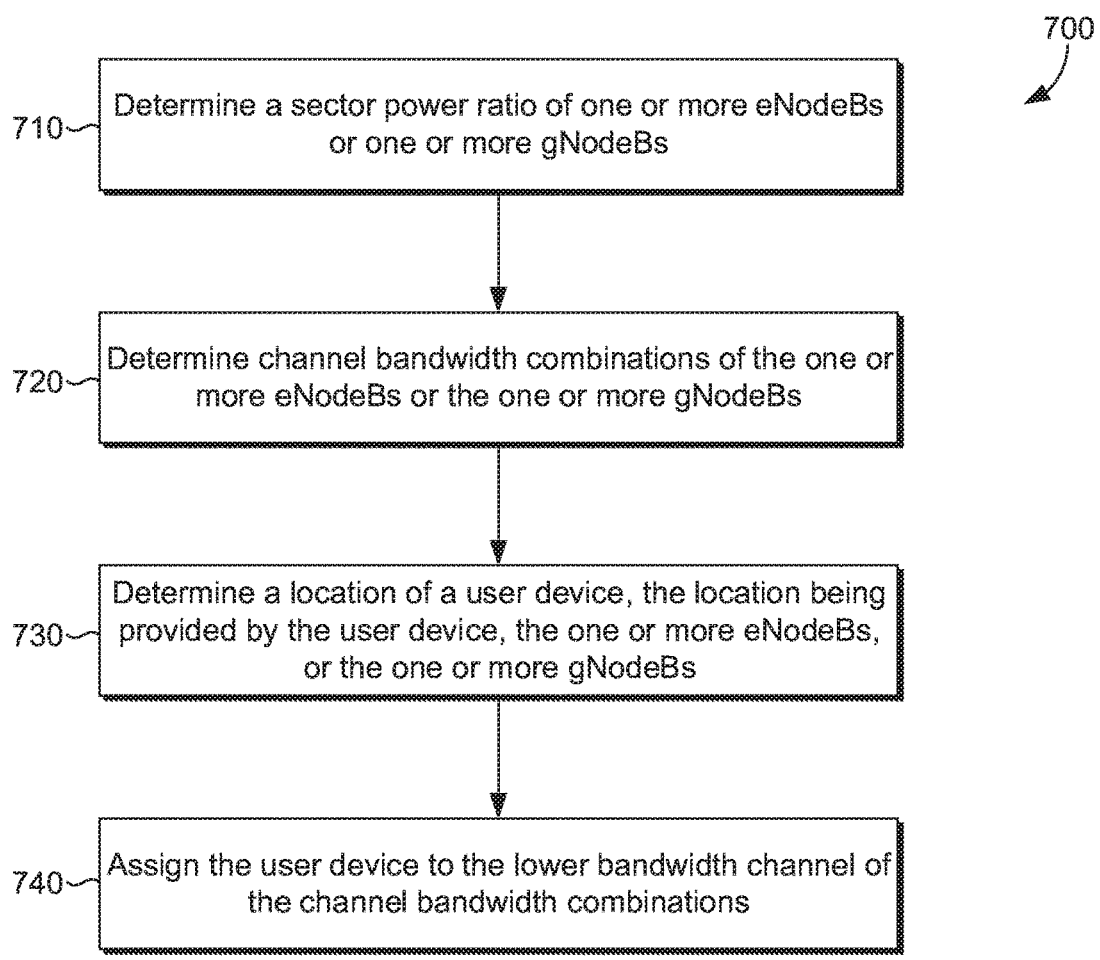
FIG. 7 depicts a flow diagram of an exemplary method for selecting an EN-DC anchor utilizing sector power ratio, in accordance with implementations of the present disclosure.

For example, and referring now to FIG. 7, flow diagram 700 comprises an exemplary method for selecting an EN-DC anchor utilizing sector power ratio, in accordance with implementations of the present disclosure. Initially, at block 710, a sector power ratio of one or more eNodeBs or one or more gNodeBs is determined. Channel bandwidth combinations of the one or more eNodeBs or the one or more gNodeBs are determined, at block 720. A location of a user device is determined at block 730. The location may be provided by the user device, the one or more eNodeBs, or the one or more gNodeBs. Based on the location of the user device, the user is assigned, at block 740, to the lower bandwidth channel of the channel bandwidth combinations.

Figure 8:
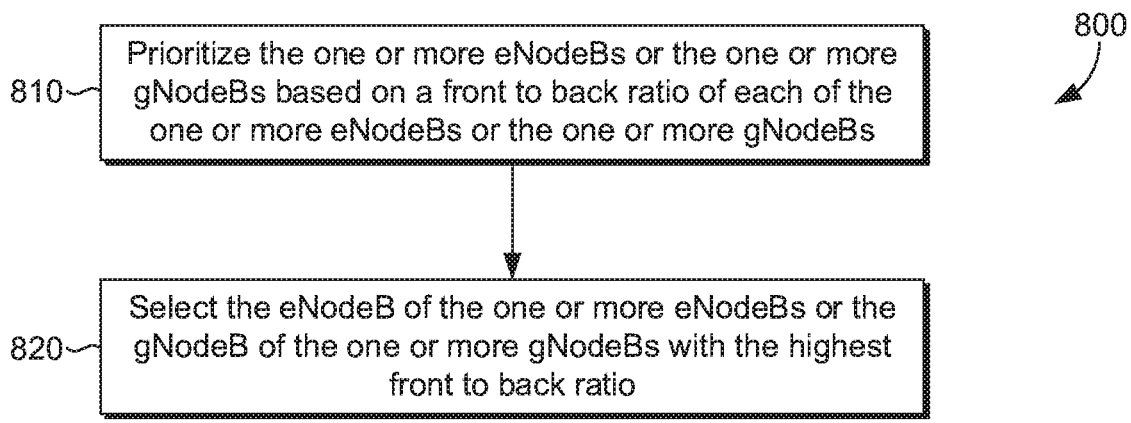
FIG. 8 depicts a flow diagram of an exemplary method for selecting an EN-DC anchor utilizing front to back ratio, in accordance with implementations of the present disclosure.

In another example, and referring now to FIG. 8, flow diagram 800 comprises an exemplary method for selecting an EN-DC anchor utilizing front to back ratio, in accordance with implementations of the present disclosure. Initially, at block 810, the one or more eNodeBs or the one or more gNodeBs are prioritized based on the front to back ratio of each of the one or more eNodeBs or the one or more gNodeBs. The eNodeB of the one or more eNodeBs or the gNodeB of the one or more gNodeBs with the highest front to back ratio is selected, at block 820.

Figure 9:
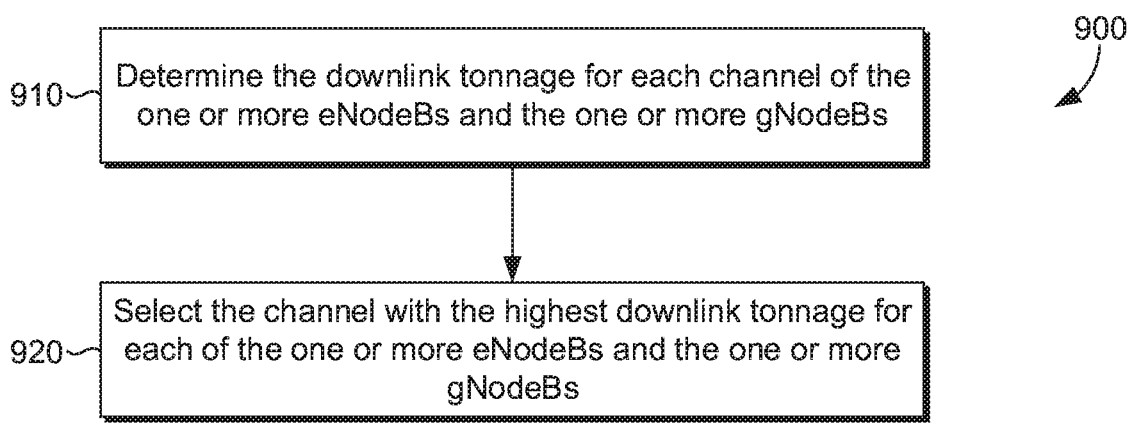
FIG. 9 depicts a flow diagram of an exemplary method for selecting an EN-DC anchor utilizing downlink tonnage, in accordance with implementations of the present disclosure.

In yet another example, and referring now to FIG. 9, flow diagram 900 comprises an exemplary method for selecting an EN-DC anchor utilizing downlink tonnage, in accordance with implementations of the present disclosure. Initially, at block 910, the downline tonnage is determined for each channel of the one or more eNodeBs and the one or more gNodeBs. The channel with the highest downlink tonnage is selected, at block 920, for each of the one or more eNodeBs and the one or more gNodeBs.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more non-transitory computer-readable media having computer-executable instructions embodied thereon that, when executed, perform a method for optimizing E-UTRAN New Radio-Dual Connectivity (EN-DC) anchor selection in a multi-band and multi-anchor network, the method comprising:
    determining one or more of a sector power ratio, a front to back ratio, or a downlink tonnage for a plurality of nodes comprising one or more Evolved Node Bs (eNodeBs) and one or more Next Generation Node Bs (gNodeBs), each of the plurality of nodes configured to wirelessly communicate with one or more user devices in a geographic service area; and
    based on the determining, selecting an eNodeBs of the one or more eNodeBs or a gNodeB of the one or more gNodeBs as an EN-DC anchor of the multi-band and multi-anchor network.

2. The media of claim 1, further comprising, upon determining the sector power ratio of the one or more eNodeBs or the one or more gNodeBs exceeds a configurable threshold, determining channel bandwidth combinations of the one or more eNodeBs or the one or more gNodeBs.

3. The media of claim 2, further comprising determining a location of a user device, the location being provided by the user device, the one or more eNodeBs, or the one or more gNodeBs.

4. The media of claim 3, further comprising, based on the location of the user device, assigning the user device to the lower bandwidth channel of the channel bandwidth combinations.

5. The media of claim 1, further comprising prioritizing the one or more eNodeBs or the one or more gNodeBs based on a front to back ratio of each of the one or more eNodeBs or the one or more gNodeBs.

6. The media of claim 5, further comprising selecting the eNodeB of the one or more eNodeBs or the gNodeB of the one or more gNodeBs with the highest front to back ratio.

7. The media of claim 1, wherein determining the downlink tonnage downlink tonnage for a plurality of nodes comprises determining the downlink tonnage for each channel of the one or more eNodeBs and the one or more gNodeBs.

8. The media of claim 7, further comprising selecting the channel for with the highest downlink tonnage for each of the one or more eNodeBs and the one or more gNodeBs.

9. A method for optimizing E-UTRAN New Radio-Dual Connectivity (EN-DC) anchor selection in a multi-band and multi-anchor network, the method comprising:
    determining one or more of a sector power ratio, a front to back ratio, or a downlink tonnage for a plurality of nodes configured to wirelessly communicate with one or more user devices in a geographic service area; and
    based on the determining, selecting a node of the plurality of nodes as an EN-DC anchor of the multi-band and multi-anchor network.

10. The method of claim 9, further comprising, determining the sector power ratio of the node of the plurality of nodes exceeds a configurable threshold.

11. The method of claim 10, further comprising determining channel bandwidth combinations of the node.

12. The method of claim 11, further comprising determining a location of a user device of the user devices.

13. The method of claim 12, further comprising, based on the location of the user device, assigning the user device to the lower bandwidth channel of the channel bandwidth combinations.

14. The method of claim 9, further comprising prioritizing the plurality of nodes based on a front to back ratio of each node of the plurality of nodes.

15. The method of claim 14, further comprising selecting the node of the plurality of nodes with the highest front to back ratio.

16. The method of claim 9, wherein determining the downlink tonnage downlink tonnage for the plurality of nodes comprises determining the downlink tonnage for each channel of at least one node of the plurality of nodes.

17. The method of claim 16, further comprising selecting the channel for with the highest downlink tonnage for the at least one node of the plurality of nodes.

18. The method of claim 12, wherein the location of the user device is provided by the user device, one or more Evolved Node Bs (eNodeBs), or one or more Next Generation Node Bs (gNodeBs).

19. The method of claim 9, wherein the plurality of nodes comprise one or more Evolved Node Bs (eNodeBs) and one or more Next Generation Node Bs (gNodeBs).

* * * * *